(12) United States Patent
Zahdeh

(10) Patent No.: US 6,886,613 B1
(45) Date of Patent: May 3, 2005

(54) MOTOR VEHICLE FUEL FILLER PIPE HAVING FUEL PUMP NOZZLE LOCATING DIMPLES

(75) Inventor: Akram R. Zahdeh, Davisburg, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/752,144

(22) Filed: Jan. 6, 2004

(51) Int. Cl.[7] .................................. B65B 1/04
(52) U.S. Cl. ...................... 141/286; 220/86.2
(58) Field of Search ................ 141/286, 349, 141/350; 220/86.2

(56) References Cited

U.S. PATENT DOCUMENTS 4,730,652 A * 3/1988 Bartholomew .............. 141/302
6,367,520 B1 * 4/2002 Palvolgyi et al. ........... 141/289
6,405,767 B1 * 6/2002 Marsala et al. .............. 141/286

* cited by examiner

Primary Examiner—Steven O. Douglas
(74) Attorney, Agent, or Firm—Laura C. Hargitt

(57) ABSTRACT

A fuel filler pipe having a dimpled filler neck, wherein the dimples serve to concentrically locate a nozzle end portion of a pump nozzle of a service station fuel pump so as to avoid premature fuel flow shut-off during fueling of the fuel tank of a motor vehicle. The dimpled filler neck is provided with three or more nozzle location dimples in the form of bosses radially protruding relative to an adjacent inner surface of the dimpled filler neck. Preferably, the dimpled filler neck has three or four mutually uniformly spaced nozzle location dimples. The nozzle location dimples are positioned at the engagement zone of the nozzle end portion with respect to the filler neck such as to loosely abut the pump nozzle and thereby ensure concentric alignment of the nozzle end portion with respect to the inner surface of the filler neck.

13 Claims, 4 Drawing Sheets

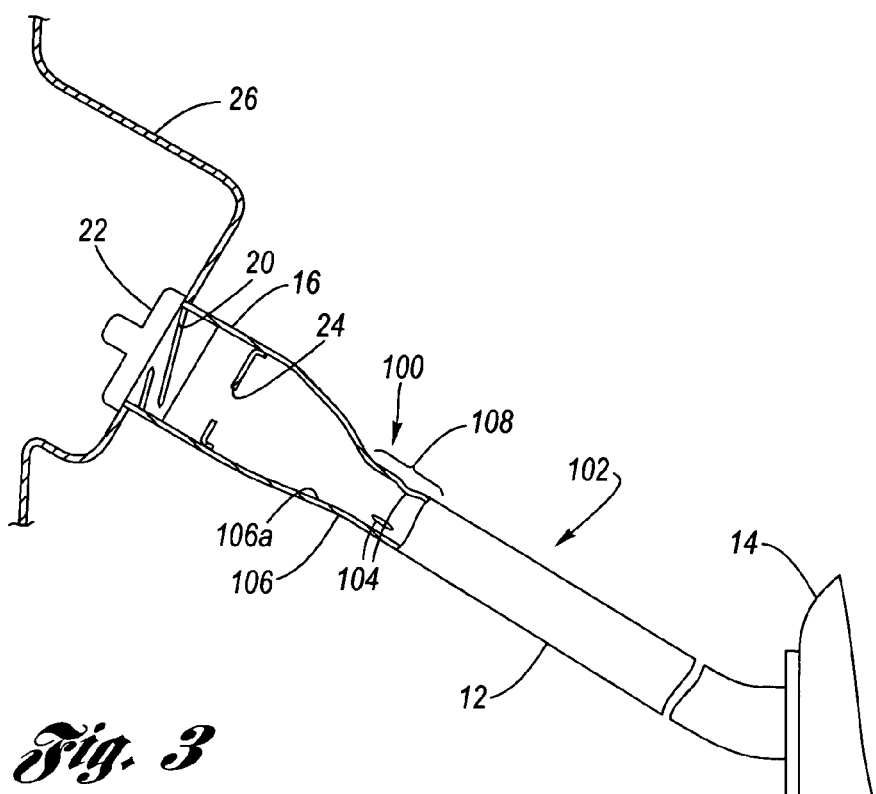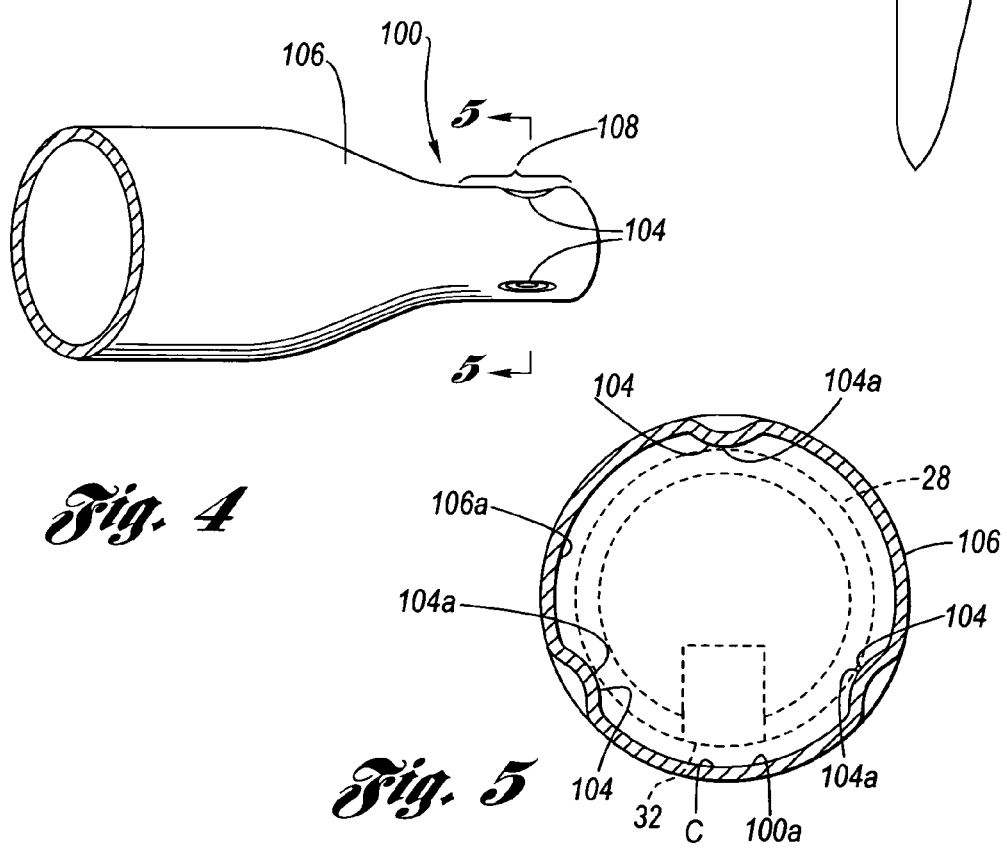

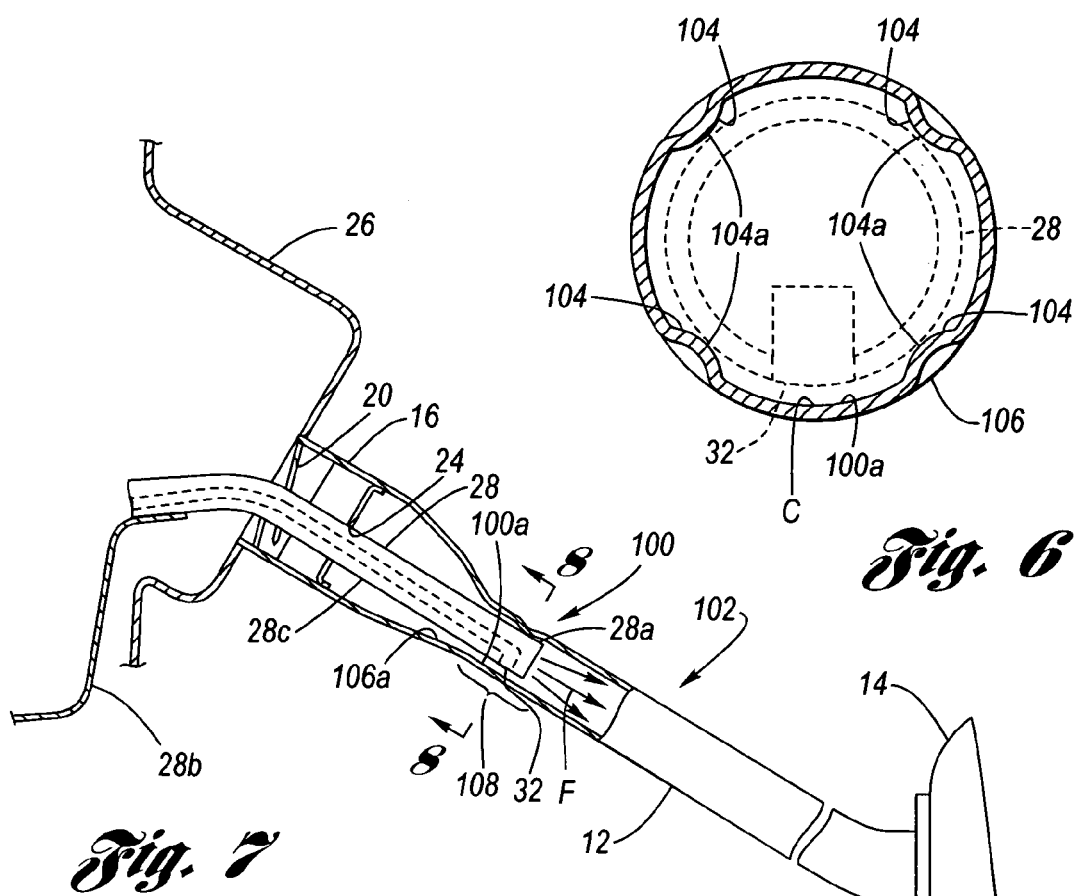
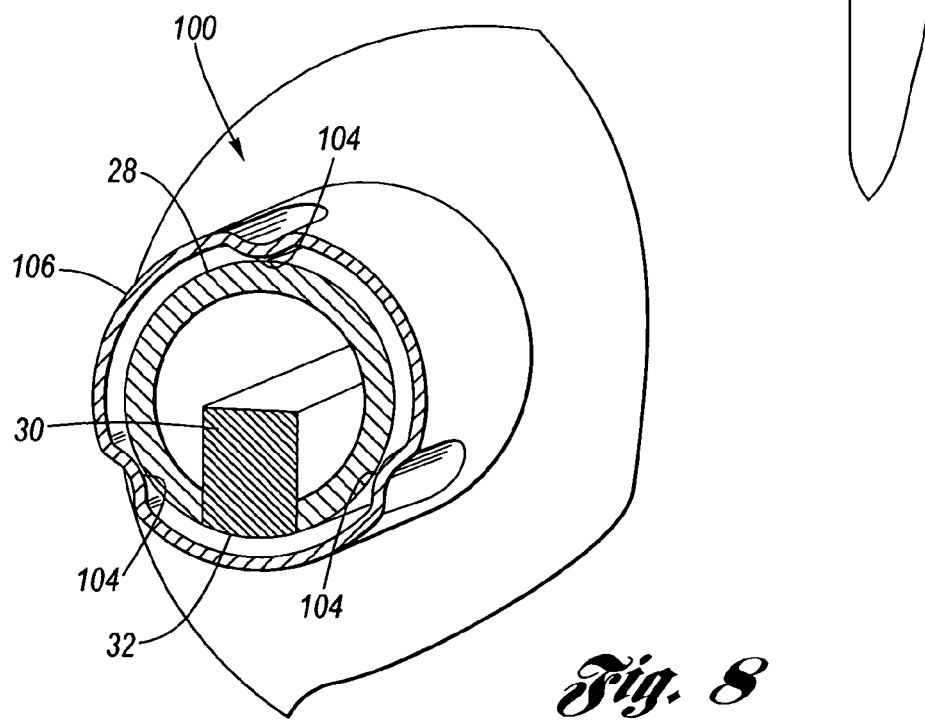

MOTOR VEHICLE FUEL FILLER PIPE HAVING FUEL PUMP NOZZLE LOCATING DIMPLES

TECHNICAL FIELD

The present invention relates to motor vehicles, and more particularly the fuel filler pipe into which a service station fuel pump nozzle is inserted in order for a customer to fill his or her fuel tank. Still more particularly, the present invention relates to a structure associated with the filler neck of the fuel filler pipe which serves to concentrically locate the end portion of the pump nozzle with respect to the fuel filler pipe so as to avoid premature fuel flow shut-off during fueling of the motor vehicle.

BACKGROUND OF THE INVENTION

The fuel tank of a motor vehicle is filled with fuel via a fuel filler pipe extending between an externally accessible location of the motor vehicle and the fuel tank, wherein fueling is accomplished by a user inserting a service station fuel pump nozzle into the fuel filler pipe.

As can be understood by reference to FIG. 1, the fuel filler pipe 10 includes a filler tube 12 connected to (at least one) fuel tank 14, a nozzle entry chamber 16 which has a generally cylindrical shape of a diameter much larger than that of the filler tube, and a filler neck 18 which has a generally frustoconical shape that provides interfacing between the filler tube and the nozzle entry chamber. The nozzle entry chamber 16 has a threaded opening 20 for threadably receiving a selectively removable filler cap (sometimes referred to as a "gas cap") 22 and further has a nozzle guide orifice 24 internally disposed in the nozzle entry chamber in spaced relation with respect to the threaded opening. The fuel filler pipe 10 is interfaced with the vehicular body 26 by connection thereto at the nozzle entry chamber 16. The fuel filler pipe 10 may be formed of metal, plastic or other suitable material.

In operation, a service station customer unthreads the filler cap 22, inserts the service station fuel pump nozzle 28 into the nozzle entry chamber 16 so that it passes through the nozzle guide orifice 24, and then begins fueling the motor vehicle. The fueling process is automatically regulated by a fuel shut-off sensor 30 in the pump nozzle. The fuel shut-off sensor 30 senses predetermined differential pressure between the fluid pressure of fuel exiting the pump nozzle 28 and the fluid pressure at an aspirator hole 32 in the pump nozzle so that fuel flow will be automatically shut-off before the fuel can accumulate sufficiently such as to overflow the fuel filler pipe.

Problematically, the fuel shut-off sensor can cause premature shut-off (PSO) of fuel flow from the pump nozzle at any time during the fueling process, even at the initial stage thereof, if an erroneous differential fluid pressure between the aspirator hole and the fuel exiting the pump nozzle is sensed by the fuel shut-off sensor. This can happen if the aspirator hole 32 is obstructed or if there is a reverse circulation of the fuel due to the fuel exiting the pump nozzle in a non-axial direction such that fuel incidentally (glancingly) strikes upon the inner surface 34a of the sidewall 34 of the fuel filler pipe 10. PSO is quite annoying to the service station customer, and can be even more so in the event PSO causes fuel to be undesireably spit from the nozzle entry chamber.

FIGS. 2A through 2C depict examples of the above mentioned causes of PSO. In FIG. 2A, the aspirator hole 32 of the fuel shut-off sensor 28 is obstructed because the aspirator hole location of the pump nozzle 28 is touching the inner surface 34a of the fuel filler pipe 10 at a nozzle engagement zone 36 of the filler neck 18. In FIG. 2B, a nozzle end portion 28a of the pump nozzle 28 is tilted out of axial alignment with the filler neck 18 at the nozzle engagement zone 36. The tilt of the nozzle end portion 28a results in the aspirator hole 32 being subjected to increased fluid pressure inducing PSO because of the fuel flow F exiting the nozzle is non-axial, resulting in the fuel incidentally (glancingly) striking upon the inner surface 34a, which, in turn, results in a fuel flow reverse circulation F'. The reverse fuel circulation causes pressure at the aspirator hole to be undesireably sensed as higher than if reverse fuel circulation was not present. In FIG. 2C, the tilt of the nozzle end portion 28a of the pump nozzle 28 at the nozzle engagement zone 36 is now opposite to that shown in FIG. 2B, wherein the aspirator hole 32 is now subject to low pressure, which causes PSO. This arises because the reverse fluid flow F' (which, as described immediately above, occurs because of non-axial fluid flow from the pump nozzle) causes an untoward increase in the pressure of the fuel exiting the pump nozzle, and in differential relation thereto, the fluid pressure sensed at the aspirator hole is artificially low because of venturi effects.

Accordingly, what remains needed in the art is some way to locate the pump nozzle of a service station fuel pump so that the automatic fuel shut-off sensor of the pump nozzle functions properly and without premature shut-off.

SUMMARY OF THE INVENTION

The present invention is a dimpled filler neck of a fuel filler pipe of a motor vehicle, wherein a service station fuel pump nozzle is concentrically located with respect to an inner surface of the dimpled filler neck so that the automatic fuel shut-off sensor of the pump nozzle functions properly and without premature shut-off (PSO) during fueling of the fuel tank of the motor vehicle.

The dimpled filler neck according to the present invention is provided with three or more nozzle location dimples, each being in the form of a boss radially protruding with respect to an adjacent inner surface of the sidewall of the dimpled filler neck. Preferably, the dimpled filler neck has three or four mutually uniformly spaced nozzle location dimples. The nozzle location dimples are positioned at an engagement zone where a nozzle end portion of the pump nozzle abuts the dimpled filler neck. The apex of the nozzle location dimples are radially and circumferentially positioned so that there is a predetermined loose fit of the pump nozzle so that concentric alignment of the nozzle end portion with respect to the inner surface of the dimpled filler neck occurs, yet the pump nozzle easily passes into and out of the engagement zone.

The dimpled filler neck according to the present invention provides avoidance of PSO because concentricity of location of the pump nozzle with respect to the fuel filler pipe, in that the aspirator hole is unobstructed, and further in that fluid pressure differential between the fluid pressure at aspirator hole of the pump nozzle and the fluid pressure of the fuel exiting the pump nozzle are properly balanced so that the fuel shut-off sensor shuts off fuel flow at the appropriate fill condition of the fuel filler pipe.

Accordingly, it is an object of the present invention to provide a dimpled filler neck of a fuel filler pipe which provides concentric location of a nozzle end portion of service station fuel pump nozzle with respect to the filler neck so as to thereby avoid premature fuel shut-off.

This and additional objects, features and advantages of the present invention will become clearer from the following specification of a preferred embodiment.

BRIEF DESCRIPTION OF THE DRAWINGS

FIG. 3 is a partly sectional side view of a fuel filler pipe incorporating a dimpled filler neck according to the present invention.

FIG. 4 is a perspective view of a dimpled filler neck according to the present invention.

FIG. 5 is a sectional view, seen along line 5—5 of FIG. 4.

FIG. 6 is a sectional view similar to FIG. 5, wherein now depicted are four nozzle location dimples.

FIG. 7 is a partly sectional side view of a fuel filler pipe incorporating a dimpled filler neck according to the present invention, shown operationally with respect to a service station fuel pump nozzle.

FIG. 8 is a sectional view, seen along line 7—7 of FIG. 6.

DESCRIPTION OF THE PREFERRED EMBODIMENT

Figure 1:
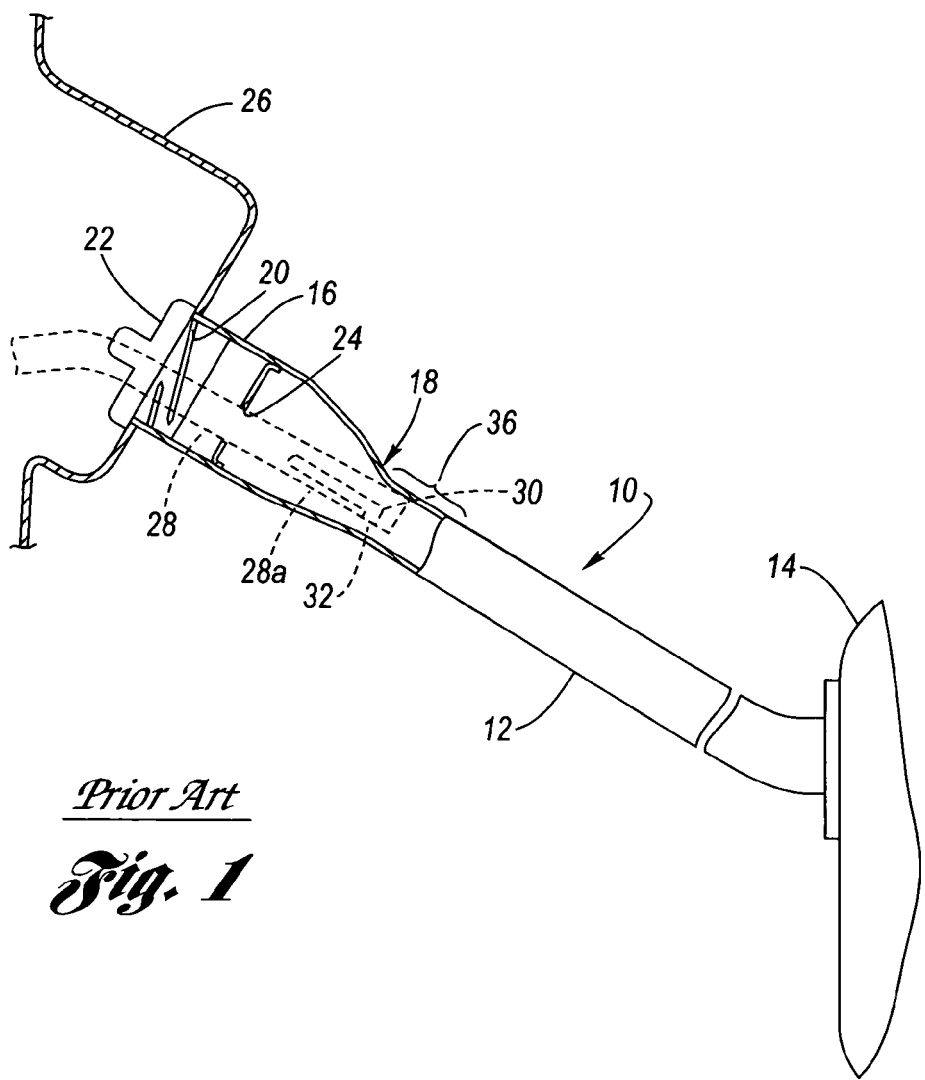
FIG. 1 is a partly sectional side view of a prior art fuel filler pipe.
Figure 2A:
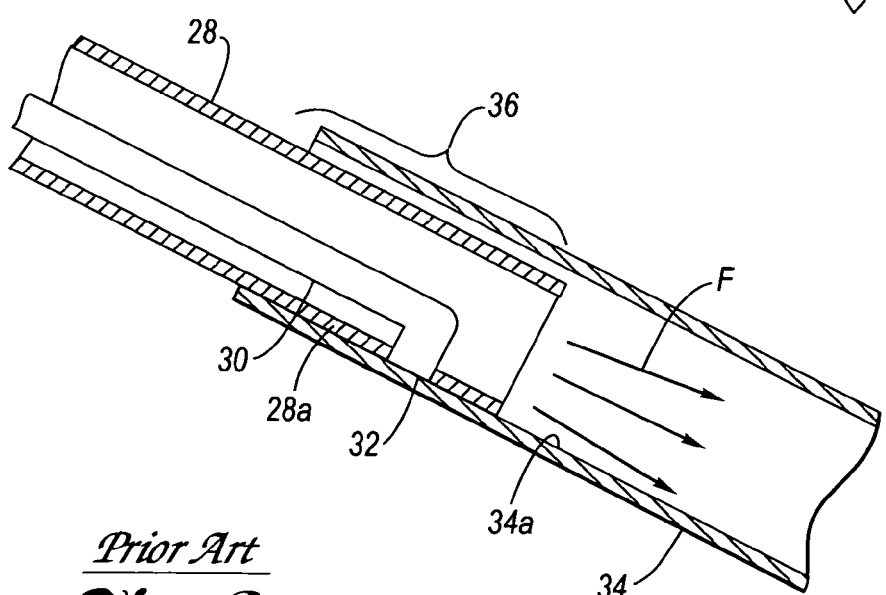
FIG. 2A is a broken-away, sectional view of a service station fuel pump nozzle in a first untoward location with respect to the inner surface of the filler neck of the fuel filler pipe of FIG. 1.
Figure 2B:
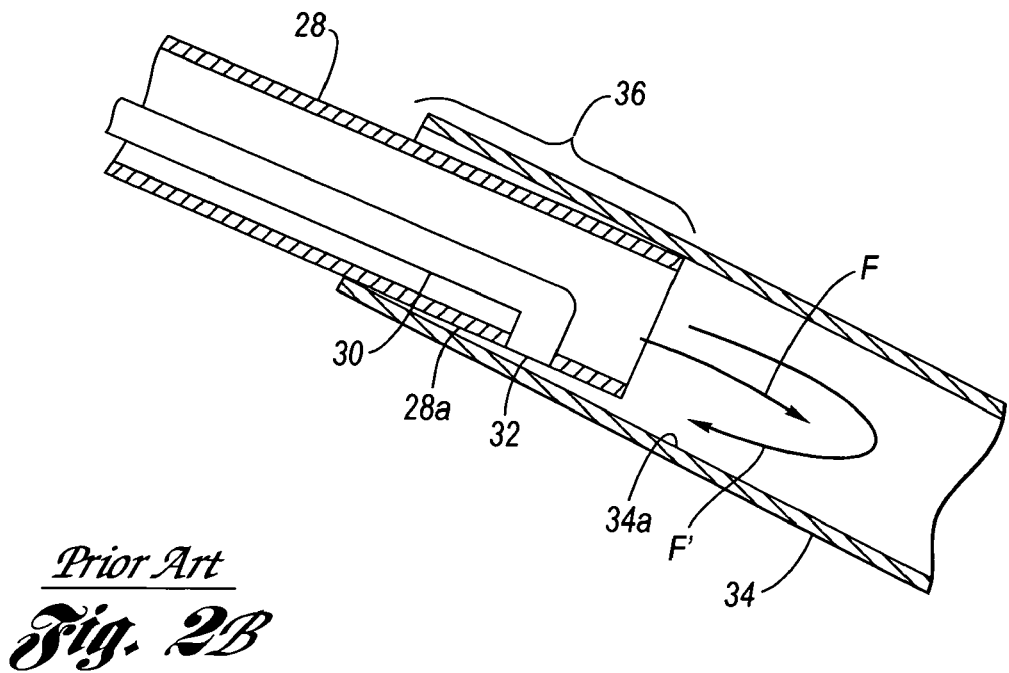
FIG. 2B is a broken-away, sectional view of a service station fuel pump nozzle in a second untoward location with respect to the inner surface of the filler neck of the fuel filler pipe of FIG. 1.
Figure 2C:
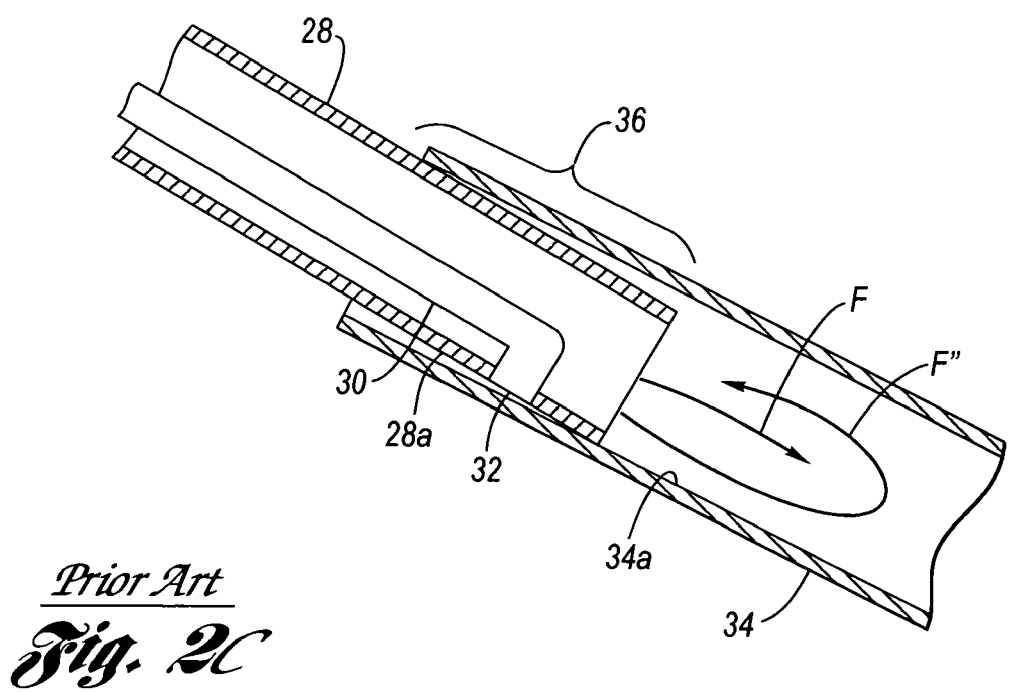
FIG. 2C is a broken-away, sectional view of a service station fuel pump nozzle in a third untoward location with respect to the inner surface of the filler neck of the fuel filler pipe of FIG. 1.

Referring now to the Drawing, FIGS. 3 through 8 depict various views of a dimpled filler neck 100 according to the present invention. In this regard, FIG. 3 depicts the dimpled filler neck 100 in operative combination with an otherwise conventional motor vehicle fuel filler pipe 102, which, in concert with the description associated with FIG. 1, includes a filler tube 12 connected to (at least one) fuel tank 14, a nozzle entry chamber 16 which has a generally cylindrical shape of a diameter much larger than that of the filler tube, wherein the generally frustoconically shaped dimpled filler neck 100 provides interfacing between the filler tube and the nozzle entry chamber. The nozzle entry chamber 16 has a threaded opening 20 for threadably receiving a selectively removable filler cap 22 and further has a nozzle guide orifice 24 internal within the nozzle entry chamber in spaced relation with respect to the threaded opening. The fuel filler pipe 102 is interfaced with the vehicular body 26 by connection thereto at the nozzle entry chamber 16. The fuel filler pipe 102 may be formed of metal, plastic or other suitable material.

The dimpled filler neck 100 is provided with at least three nozzle location dimples 104, wherein each dimple is in the form of a boss which radially protrudes with respect to the adjacent inner surface 106a of the sidewall 106 of the dimpled filler neck 100. The nozzle location dimples 104 are positioned at the nozzle engagement zone 108 where the nozzle end portion 28a of a service station fuel pump nozzle 28 comes into abutment with the dimpled filler neck 100, such that the abutment will be at the apex 104a of the nozzle location dimples 104 (see FIG. 7).

The fuel filler pipe 102 may be formed and/or assembled in a manner known in the art, as for example from a conventional cylindrical metal pipe material having a substantially uniform or non-uniform diameter, which is formed according to a conventional method, as for example by hydroforming, casting or other suitable forming methods. The forming of the nozzle positioning dimples 104, in this regard, may be by, for example, rolling a filler neck on a suitably configured fixture of a rolling machine so as to provide the dimpled filler neck 100, or simply by casting or hydroforming the dimpled filler neck utilizing a suitably configured die having protruding bosses, wherein each boss provides a nozzle location dimple 104.

While it is preferred for the nozzle locating dimples 104 to be integrally formed of the sidewall 106 of the dimpled filler nozzle 100, they may alternatively be discrete components which are affixed to the inner surface 106a of the sidewall 106, as for example by welding or an adhesive.

Preferably, the dimpled filler neck 100 has three or four dimples 104 which are mutually spaced in serially equidistant relation about the circumference of the inner surface 106a of the dimpled filler neck 100, and running axially therealong. As shown at FIGS. 4 and 5, for three nozzle location dimples 104 the mutual spacing therebetween is 120 degrees, and as shown at FIG. 6, for four nozzle location dimples the mutual spacing is 90 degrees therebetween.

The pump nozzle 28 is connected to a handle 28b (shown schematically in FIG. 7) which includes a manually operated fuel flow switch (not shown for simplicity). The orientation of the handle 28b relative to the pump nozzle 28 defines a bottom surface 28c of the pump nozzle, wherein the aspirator hole 32 is located at the bottom surface. In this regard, because of a standard vertical plane of orientation of the handle 28b, the pump nozzle 28 is oriented in the dimpled filler neck 100 with the aspirator hole 32 oriented downwardly by the customer. Accordingly, the trough 100a (lowest point gravitationally) of the dimpled filler neck 100 is free of nozzle location dimples 104, wherein it is preferred that a centerpoint C between nozzle location dimples be located at the trough 100a.

While three nozzle location dimples 104 provide concentric location of the nozzle end portion 28a of the pump nozzle 28 with a minimal chance of a dimple occluding the aspirator hole 32 in the event the pump nozzle is rotated off from vertical (wherein the handle is similarly also off from vertical, which is uncommon to happen), four dimples may provide a higher precision of concentric location of the nozzle end portion with less protrusioning of the nozzle location dimples.

As shown at FIGS. 5, 6 and 8, the nozzle location dimples 104 protrude with respect to the inner surface 106 such that the apices 104a thereof serve to concentrically locate the nozzle end portion 28a, yet provide a loose interfit therebetween so that the pump nozzle 28 is easily slidable into and out of the engagement zone 108.

With particular reference to FIGS. 6 and 7, operation of the dimpled filler neck 100 will be detailed.

A service station customer unthreads the filler cap 22, inserts the service station fuel pump nozzle 28 into the nozzle entry chamber 16 so that it passes through the nozzle guide orifice 24, and then begins fueling. In this regard, it will be seen that the nozzle end portion 28a has passed into the engagement zone 108 so that it is now located concentrically in relation to the inner surface 106 of the dimpled filler neck 100 by abutment with the apices 104*a* of the nozzle location dimples 104.

As mentioned hereinabove, the fueling process is regulated by the automatic fuel shut-off sensor 30 located in the pump nozzle 28 which senses predetermined pressure differential conditions in the fuel filler pipe 102 so that fuel flow will be automatically shut-off before the fuel can accumulate sufficiently to overflow the fuel filler pipe 102. In this regard, the fuel shut-off sensor 30 will not be subject to premature shut-off (PSO) of fuel flow at any time during the fueling process because 1) the aspirator hole 32 will not be obstructed by the inner surface 106*a* of the sidewall 106 of the dimpled filler neck 100, and 2) the fuel F flowing out from the nozzle 28 will be axially aligned with the dimpled filler neck 100 of the fuel filler pipe 102, without the presence of a fluid pressure differential between the aspirator hole and the nozzle exit caused by fuel flow reverse circulation. Accordingly, the automatic fuel shut-off 30 will terminate fuel flow automatically when the fuel has reached a predetermined level in the fuel filler pipe without PSO and without fuel spit from the nozzle entry chamber.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A motor vehicle fuel fill system, comprising:
   a fuel filler pipe of a motor vehicle;
   a service station fuel pump nozzle having a nozzle end portion, the end portion having an aspirator hole of an automatic fuel shutoff sensor in the nozzle, wherein the nozzle is inserted into the pipe such that the end portion of the nozzle reaches an engagement zone of the pipe for delivering fuel to the motor vehicle; and
   at least three dimples circumferentially spaced around, and radially protruding in relation to, an adjacently disposed inner surface of said fuel filler pipe;
   wherein said at least three dimples are located at the engagement zone of said fuel filler pipe providing a predetermined radial loose interfit to the pump nozzle and concentrically locating the nozzle end portion with respect to said inner surface through abutment of an apex of said at least three dimples with an outer cylindrical surface of said nozzle end portion; and
   wherein said at least three dimples are located with respect to said fuel filler pipe so that the aspirator hole is not occluded by any dimple of said at least three dimples.

2. The improvement of claim 1, wherein said at least three dimples comprise three dimples mutually separated by 120 degrees.

3. The improvement of claim 2, wherein said fuel filler pipe has a sidewall; wherein said dimples are integrally formed of said sidewall.

4. The improvement of claim 1, wherein said at least three dimples comprise four dimples mutually separated by 90 degrees.

5. The improvement of claim 4, wherein said fuel filler pipe has a sidewall; wherein said dimples are integrally formed of said sidewall.

6. A fuel filler pipe comprising:
   a filler tube;
   a nozzle entry chamber; and
   a dimpled filler neck disposed between said filler tube and said nozzle entry chamber, said dimpled filler neck having at least three dimples circumferentially spaced around, and radially protruding in relation to, an adjacently disposed inner surface of said dimpled filler neck;
   wherein said at least three dimples are located at a predetermined nozzle engagement zone of said dimpled filler neck providing a predetermined radial loose interfit to a pump nozzle and concentrically locating the nozzle with respect to said filler neck through abutment of an apex of said at least three dimples with an outer cylindrical surface of the nozzle; and
   wherein said dimpled filler neck has a trough at a gravitationally lowest location thereof; said trough being free of a dimple.

7. The fuel filler pipe of claim 6, wherein said at least three dimples comprises three dimples mutually separated by 120 degrees.

8. The fuel filler pipe of claim 6, wherein a centerpoint between an adjacent pair of said dimples is located substantially at said trough.

9. The fuel pipe of claim 8, wherein said dimpled filler neck has a sidewall; wherein said dimples are integrally formed of said sidewall.

10. The fuel filler pipe of claim 6, wherein said at least three dimples comprises four dimples mutually separated by 90 degrees.

11. The fuel filler pipe of claim 6, wherein a centerpoint between an adjacent pair of said dimples is located substantially at said trough.

12. The fuel pipe of claim 11, wherein said dimpled filler neck has a sidewall; wherein said dimples are integrally formed of said sidewall.

13. A method for fueling a motor vehicle, said method comprising the steps of:
   inserting a service station fuel pump nozzle having a nozzle end portion with an aspirator hole of an automatic fuel shut-off sensor into a filler pipe of the motor vehicle such that the end portion of the nozzle reaches an engagement zone of the filler pipe; and
   abutting an outer cylindrical surface of the nozzle against at least three dimples circumferentially spaced around, and radially protruding in relation to, an adjacently disposed inner surface of the filler pipe in the engagement zone such as to concentrically align the nozzle with respect to the filler pipe;
   wherein the aspirator hole is free of abutment with respect to said filler pipe.

* * * * *